US012528167B2

(12) United States Patent
Hirai

(10) Patent No.: US 12,528,167 B2
(45) Date of Patent: Jan. 20, 2026

(54) WORKING MACHINE

(71) Applicant: KOKI HOLDINGS CO., LTD., Tokyo (JP)

(72) Inventor: Takahiro Hirai, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 19/034,087

(22) Filed: Jan. 22, 2025

(65) Prior Publication Data

US 2025/0242482 A1 Jul. 31, 2025

(30) Foreign Application Priority Data

Jan. 31, 2024 (JP) ................................ 2024-013475

(51) Int. Cl.
*B25C 1/06* (2006.01)

(52) U.S. Cl.
CPC ..................................... *B25C 1/06* (2013.01)

(58) Field of Classification Search
CPC ....................................................... B25C 1/06
See application file for complete search history.

(56) References Cited

U.S. PATENT DOCUMENTS 5,649,661 A * 7/1997 Masuno .................... B25C 7/00 227/8
8,833,628 B2 * 9/2014 Schwartzenberger ...................... B25C 5/1658 227/109
2020/0070330 A1 * 3/2020 Carrier ................... H02K 11/30
2023/0381937 A1 * 11/2023 Tago ....................... B25C 1/047

FOREIGN PATENT DOCUMENTS

JP 2023-157401 A 10/2023

* cited by examiner

*Primary Examiner* — Michelle Lopez
(74) *Attorney, Agent, or Firm* — Rimon P.C.

(57) ABSTRACT

A working machine includes a striking unit, an ejection unit, and a supply unit. The ejection unit ejects a nail, struck by the striking unit, to a lower side along a virtual axis extending in an up-down direction. The supply unit is on a back side relative to the ejection unit. The ejection unit has an end surface at a lower end portion. The end surface has flat, receded, and cutout portions. The flat portion is on a front side relative to the axis, and extends to surround the axis. The receded portion is on a back side of the axis, and located above the flat portion. As viewed in a left-right direction, the cutout portion is located between the flat and receded portions in a front-back direction, and spaced from a virtual line connecting the back end of the flat portion and the front end of the receded portion.

13 Claims, 12 Drawing Sheets

WORKING MACHINE

BACKGROUND

Technical Field

The present invention relates to a working machine.

Related Art

A fastener driving machine described in JP-A-2023-157401 includes a striking unit, an ejection unit, a push lever, and a controller. The striking unit has a piston and a driver blade. The ejection unit is provided with an ejection path and the push lever. When the push lever is pressed against a partner member and moves upward, a predetermined signal is output from the push lever to the controller. A nail struck by the striking unit passes through the ejection path, and is driven into the partner member.

When a nail is driven into a partner member using a working machine such as the fastener driving machine disclosed in JP-A-2023-157401, swirling dust may enter the ejection unit. At this time, when the dust having entered the ejection unit is discharged to the outside of the ejection unit, there is a possibility that part of the discharged dust adheres to a mechanism of the working machine and the mechanism becomes difficult to operate.

SUMMARY

An object of the present invention is to provide a working machine with improved convenience.

A working machine according to one embodiment includes a striking unit, an ejection unit, and an operation mechanism. The striking unit strikes a fastener. The ejection unit ejects the fastener, which is struck by the striking unit, to one side in a first direction along a virtual axis extending in the first direction. The operation mechanism is located on one side in a second direction orthogonal to the first direction with respect to the ejection unit. The ejection unit has an end surface located at an end portion on the one side in the first direction. The end surface has a flat portion, a receded portion, and a cutout portion. The flat portion is located on the other side in the second direction with respect to the virtual axis, and extends so as to surround the virtual axis. The receded portion is located on the one side in the second direction with respect to the virtual axis, and is located on the other side in the first direction with respect to the flat portion. As viewed in a third direction orthogonal to both the first direction and the second direction, the cutout portion is located between the flat portion and the receded portion in the second direction, and is located apart from a virtual line connecting the end of the flat portion on the one side in the second direction and the end of the receded portion on the other side in the second direction.

According to the present invention, the convenience of the working machine can be improved.

DESCRIPTION OF THE EMBODIMENTS

Hereinafter, working machines according to first, second, and third embodiments and modifications of the present invention will be described in detail with reference to the drawings. Note that in all the drawings referred to for describing each embodiment and modification, the same or substantially the same components and elements are denoted by the same reference signs. In addition, in principle, repeated description of components and elements once described will not be made.

Configuration of First Embodiment

Figure 1:
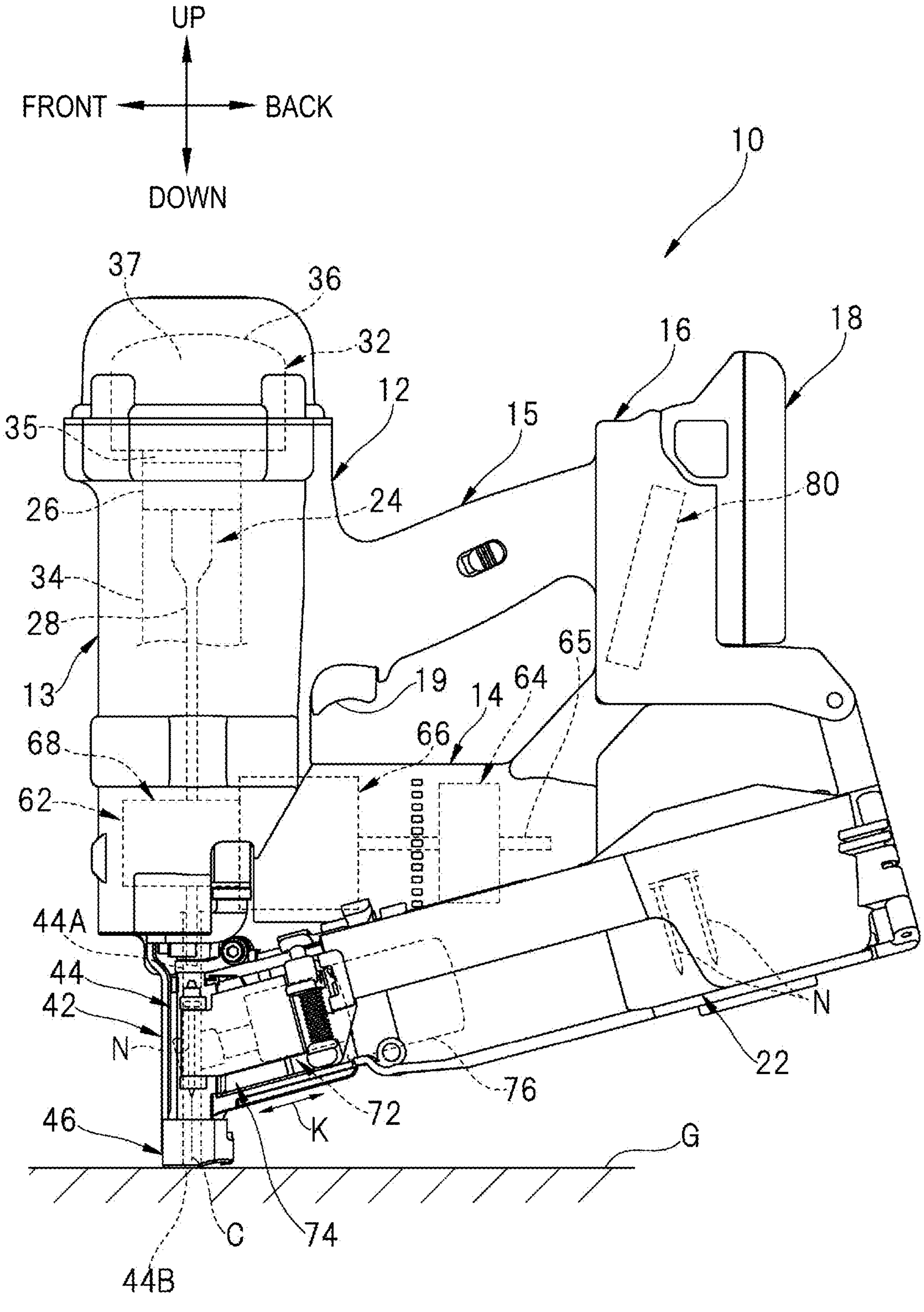
FIG. 1 is a right side view showing the appearance of a nailing machine according to a first embodiment.

FIG. 1 shows a nailing machine 10 as a working machine according to the first embodiment. In the nailing machine 10, when a predetermined condition is satisfied, a nail N, which is one example of a fastener, is struck by a striking unit 24. As a result, the nail N is ejected from an ejection unit 42 and driven into a partner member G. Note that details of the striking unit 24 and the ejection unit 42 will be described later.

A direction in which the nail N is ejected by the ejection unit 42 will be defined as an up-down direction. The up-down direction is one example of a first direction. A virtual line extending in the up-down direction will be defined as a virtual axis C. The virtual axis C is the center axis of an ejection path 44A to be described later. The striking unit 24 strikes the nail N to the lower side in the up-down direction. The lower side is one example of one side in the first direction.

Directions orthogonal to the up-down direction will be defined as a front-back direction and a left-right direction. The front-back direction and the left-right direction are orthogonal to each other. Note that the up-down direction, the front-back direction, and the left-right direction are merely set for the sake of convenience in description. The front-back direction is one example of a second direction. The back side in the front-back direction is one example of one side in the second direction. The left-right direction is one example of a third direction.

When the nailing machine 10 is viewed in the left-right direction, a direction in which a supply unit 72 to be described later moves will be defined as a K-direction. The K-direction crosses both the up-down direction and the front-back direction when viewed in the left-right direction. The K-direction is indicated by an arrow K. A side on which the ejection unit 42 is located in the K-direction will be defined as a front side.

Specifically, the nailing machine 10 includes a housing 12, a magazine 22, the striking unit 24, a striking force generation unit 32, the ejection unit 42, a drive unit 62, the supply unit 72, and a control unit 80.

Housing

As shown in FIG. 1, the nailing machine 10 includes the housing 12. The housing 12 includes two housing members butted against each other in the left-right direction and fixed with a not-shown screw. Thus, each member of the nailing machine 10 is housed in the housing 12.

The housing 12 has a cylinder housing portion 13, a motor housing portion 14, a handle 15, and an attachment portion 16.

The cylinder housing portion 13 is provided in a tubular shape extending in the up-down direction. The motor housing portion 14 extends to the back side from a lower portion of the cylinder housing portion 13 along the front-back direction. The striking unit 24 is provided inside the cylinder housing portion 13. The handle 15 extends obliquely upward from a center portion of the cylinder housing portion 13 to the back side.

The handle 15 is a portion of the housing 12 to be gripped by a worker. The handle 15 is located on the back side with respect to the ejection unit 42 as viewed in the up-down direction. The handle 15 is provided with a trigger 19 that switches a predetermined signal (ON signal, OFF signal) for an operation of driving the nail N. When the worker operates the trigger 19, the ON signal or the OFF signal is transmitted from a not-shown trigger switch to the control unit 80.

The attachment portion 16 is connected to a back end portion of the handle 15 and a back end portion of the motor housing portion 14. A battery pack 18 is detachably attached to the attachment portion 16. The control unit 80 is housed inside the attachment portion 16.

Magazine

The magazine 22 is detachably provided in the housing 12 over a lower end portion of the motor housing portion 14 and a lower end portion of the attachment portion 16. The magazine 22 is located on the side (back side) opposite to the ejection unit 42 side (front side). A plurality of nails N is housed in the magazine 22 in a state of being wound in a roll shape. The plurality of nails N housed in the magazine 22 is fed one by one to the ejection unit 42 by a feeding operation of a feeder 74 to be described later.

Striking Unit

The striking unit 24 is biased to the lower side (ejection unit 42 side) in the up-down direction by the striking force generation unit 32, thereby striking the nail N of the ejection unit 42 toward the partner member G. The striking unit 24 has a piston 26 and a driver blade 28.

Piston

The piston 26 is housed inside a cylinder 34 to be described later so as to be reciprocately movable along the up-down direction. In other words, the piston 26 is provided in the cylinder 34 so as to be reciprocately movable between a top dead center and a bottom dead center along the axial direction of the cylinder 34. Further, the piston 26 is biased to the lower side by receiving the biasing force (pressure) from the striking force generation unit 32.

Driver Blade

The driver blade 28 is coupled to a lower portion of the piston 26. The driver blade 28 is, as one example, a plate-shaped member made of metal. The driver blade 28 extends to the lower side along the up-down direction from the lower surface of the piston 26. The driver blade 28 is provided with a plurality of racks arranged at intervals in the up-down direction. Note that the plurality of racks is not shown in the figure. The driver blade 28 can reciprocate in the up-down direction integrally with the piston 26 inside the cylinder 34. The driver blade 28 strikes the head of the nail N, which is sequentially supplied to the ejection path 44A to be described later, toward the lower side.

Striking Force Generation Unit

The striking force generation unit 32 biases the striking unit 24 to the lower side in the up-down direction. The striking force generation unit 32 includes the cylinder 34 and a chamber 36. The cylinder 34 and the chamber 36 are provided inside the cylinder housing portion 13. A piston chamber 35 is formed inside the cylinder 34. An accumulator chamber 37 is formed inside the chamber 36.

The piston chamber 35 and the accumulator chamber 37 are filled with compressed air as one example of high-pressure gas. The striking force generation unit 32 biases the striking unit 24 to the lower side by the pressure of the compressed air in the accumulator chamber 37. In other words, the striking force generation unit 32 is one example of a biasing unit that applies the biasing force to the striking unit 24 so as to strike the nail N.

Ejection Unit

The ejection unit 42 is located on the lower side with respect to the cylinder housing portion 13. The ejection unit 42 extends to the lower side from a lower end portion of the cylinder 34 along the up-down direction. The ejection unit 42 is formed in a tubular shape. The ejection unit 42 has the ejection path 44A extending in the up-down direction. The ejection unit 42 ejects the nail N struck by the striking unit 24 to the lower side from the ejection path 44A. Specifically, the ejection unit 42 includes a blade guide 44 and a push lever 46 movable in the up-down direction along the blade guide 44.

Blade Guide

Figure 3:
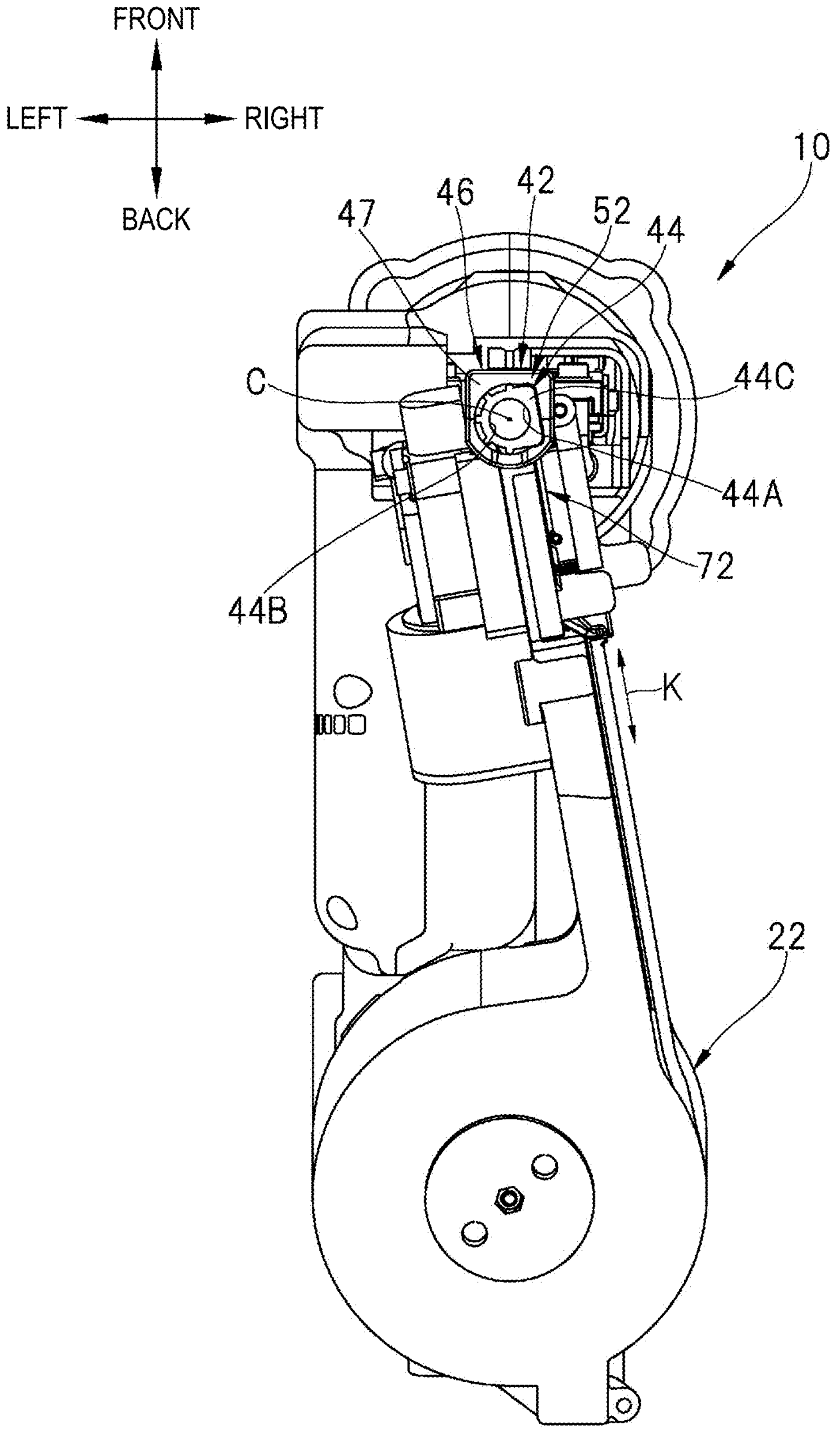
FIG. 3 is a bottom view of the nailing machine of FIG. 1 as viewed from below.

The blade guide 44 is one example of a base portion defining the ejection path 44A through which the nail N is ejected. The blade guide 44 guides the driver blade 28 in the up-down direction. The blade guide 44 is formed in a tubular shape with the virtual axis C as a center axis. The ejection path 44A is provided inside the blade guide 44. Note that the ejection path 44A is formed in a cylindrical shape. The virtual axis C is also the center axis of the ejection path 44A. The virtual axis C is also the center axis of a tip end portion of the driver blade 28 that is guided by the blade guide 44 and moves accordingly. An ejection port 44B is provided at the lower end of the ejection path 44A. The blade guide 44 has a lower surface 44C (FIG. 3). The lower surface 44C is located at the lower end of the blade guide 44.

The supply unit 72 supplies the nails N one by one from the magazine 22 to the ejection path 44A. Note that details of the supply unit 72 will be described later. In the ejection unit 42, the nail N receives striking force from the striking unit 24, and accordingly, is ejected toward the partner member G. In other words, the ejection unit 42 ejects the nail N, which is struck by the striking unit 24, to the lower side along the virtual axis C.

Push Lever

The push lever 46 is one example of a movable portion provided movably in the up-down direction relative to the blade guide 44. Specifically, the push lever 46 is located outside the blade guide 44. The push lever 46 is held movably in the up-down direction by the blade guide 44. The push lever 46 is biased to the lower side by a not-shown spring.

When pressed against the partner member G, the push lever 46 moves to the upper side against the biasing force of the not-shown spring. At this time, a predetermined detection signal is output from a not-shown sensor to the control unit 80. Note that FIGS. 1 and 2 show a state in which the push lever 46 is pressed against the partner member G and moves upward relative to the blade guide 44 accordingly.

Figure 2:
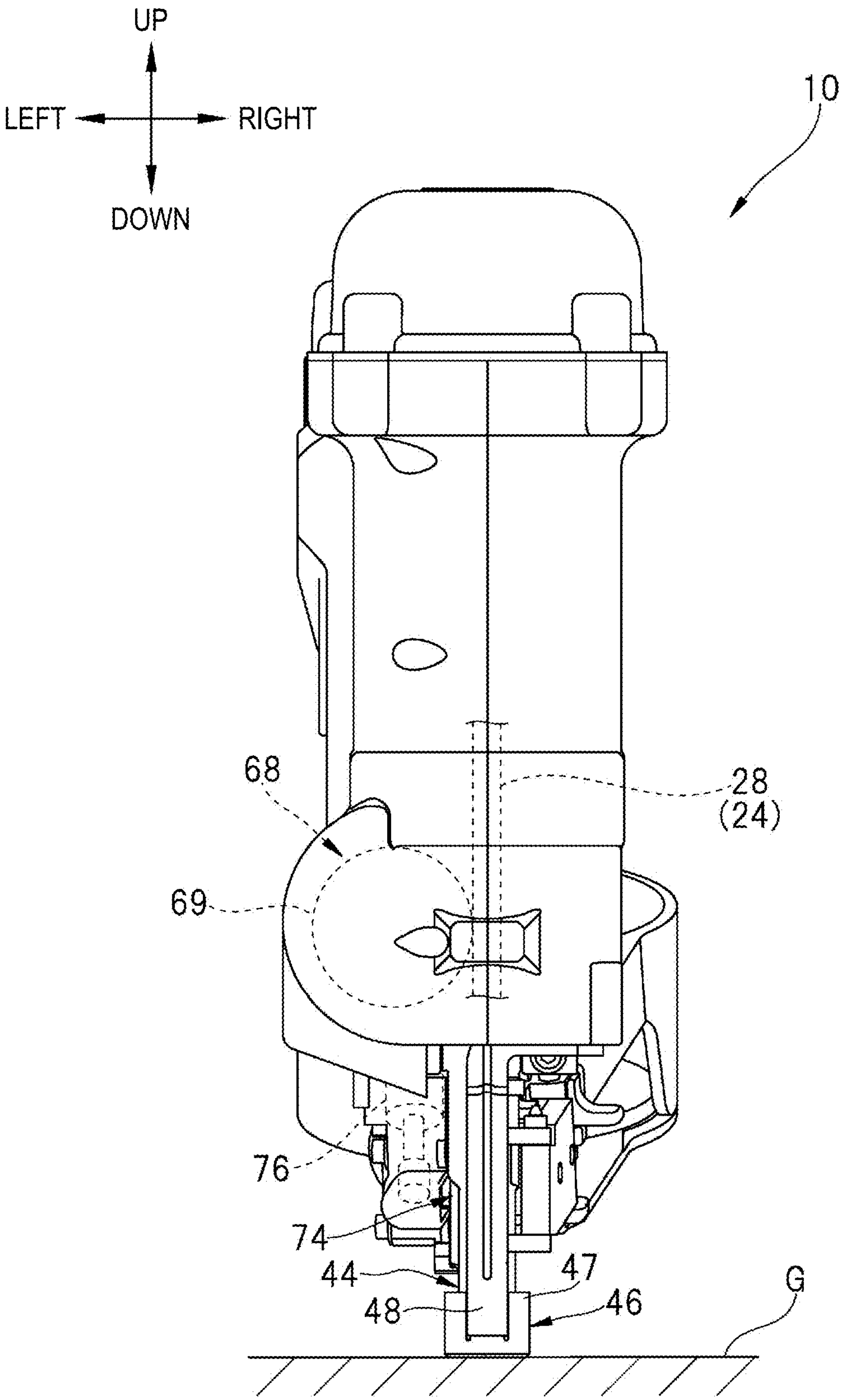
FIG. 2 is a front view of the nailing machine of FIG. 1 as viewed from the front.

As shown in FIG. 2, the push lever 46 has a tubular portion 47 that comes into contact with the partner member G, and a plate portion 48 extending to the upper side from the front end of the tubular portion 47 in the up-down direction. The tubular portion 47 and the plate portion 48 are integrally formed.

As shown in FIG. 3, a front portion of the tubular portion 47 with respect to the virtual axis C is formed in a rectangular tubular shape. A back portion of the tubular portion 47 with respect to the virtual axis C is formed in a semi-cylindrical shape. The plate portion 48 (FIG. 2) is guided by the outer peripheral surface of the blade guide 44, and accordingly is movable in the up-down direction.

The ejection unit 42 has an end surface 52 located at a lower end in the up-down direction. The end surface 52 is provided at the push lever 46, as one example. Note that in the nailing machine 10 of the first embodiment, the lower surface 44C is formed in a planar shape along the front-back direction and the left-right direction. The lower surface 44C does not have a portion for increasing the discharge amount of dust P. Thus, the lower surface 44C is not included in the end surface 52.

End Surface of Ejection Unit

Figure 4:
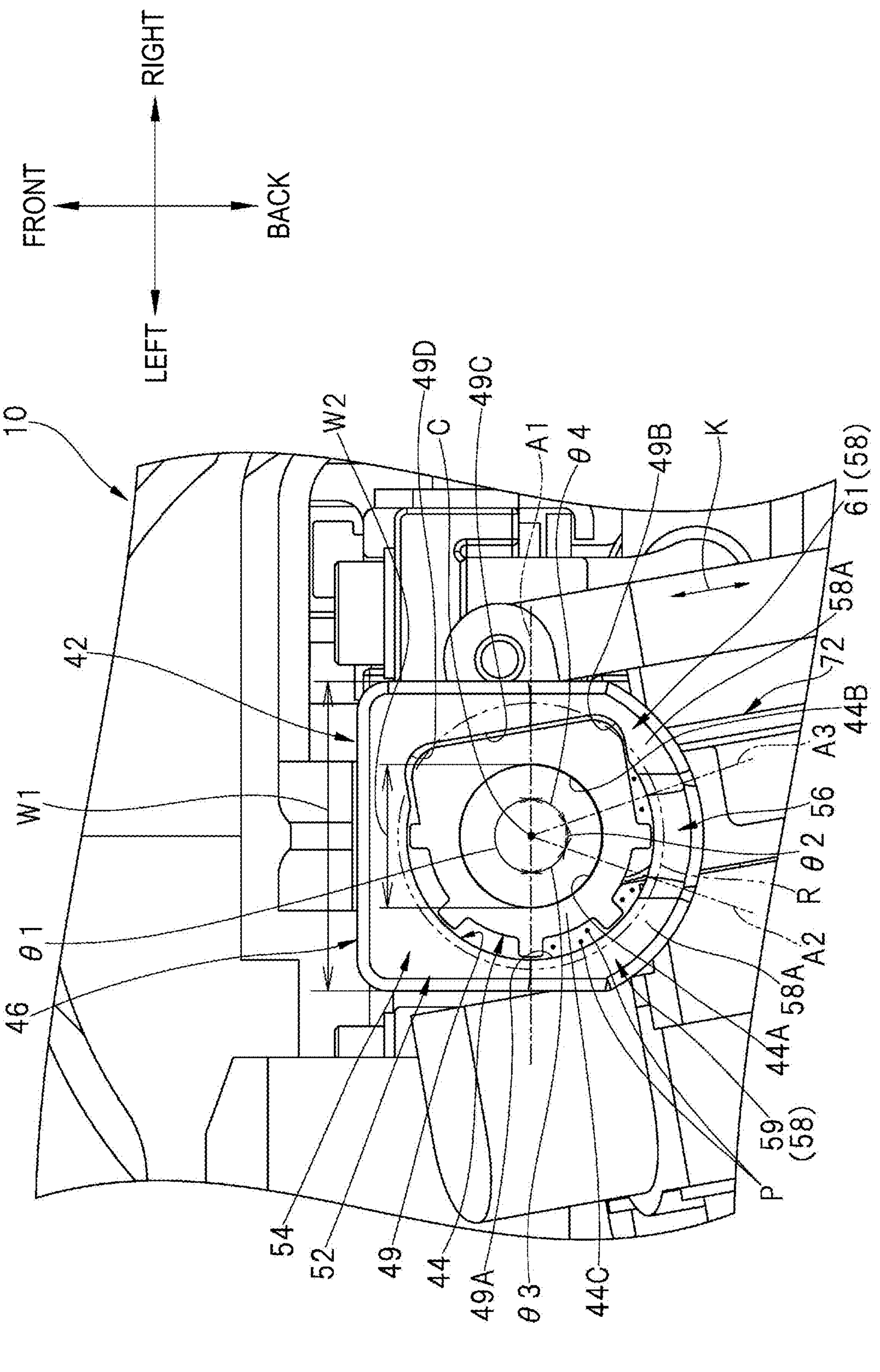
FIG. 4 is an enlarged bottom view of an ejection unit of the nailing machine of FIG. 1.

FIG. 4 shows the state of the end surface 52 of the ejection unit 42 from the lower side. The end surface 52 has a flat portion 54, a receded portion 56, and a cutout portion 58. Note that in the following description, a circumferential direction centered on the virtual axis C will be referred to as a “circumferential direction.” In addition, an area where each of the flat portion 54, the receded portion 56, and the cutout portion 58 is provided will be represented using a center angle. Specifically, when the end surface 52 is viewed from the lower side in the up-down direction, the area of each of the flat portion 54, the receded portion 56, and the cutout portion 58 is represented using the center angle (in units of degree) of a virtual circle R centered on one point on the virtual axis C.

A virtual line passing through the virtual axis C along the left-right direction is defined as a boundary line A1. As one example, the boundary line A1 represents a virtual boundary between the flat portion 54 and the cutout portion 58. A virtual line connecting the virtual axis C and the left end position of the inner peripheral surface of the receded portion 56 is defined as a boundary line A2. The boundary line A2 represents a virtual boundary between a left cutout portion 59 to be described later and the receded portion 56. A virtual line connecting the virtual axis C and the right end position of the inner peripheral surface of the receded portion 56 is defined as a boundary line A3. The boundary line A3 represents a virtual boundary between a right cutout portion 61 to be described later and the receded portion 56.

Flat Portion

The flat portion 54 is located on the front side (other side in the second direction) with respect to the virtual axis C, and extends in the circumferential direction centered on the virtual axis C. In other words, the flat portion 54 is located on the front side with respect to the virtual axis C, and extends so as to surround the virtual axis C. Note that “surround” includes not only a state of surrounding the entirety of a target but also a state of surrounding part of the target from the outside.

The flat portion 54 is a planar portion of the end surface 52 orthogonal to the up-down direction. The flat portion 54 is provided in an area where the center angle θ1 is 180 degrees or more. Specifically, the flat portion 54 is provided in an area where the center angle θ1 is 180 degrees. As described above, the flat portion 54 is provided on the front side with respect to the virtual axis C in the area of the end surface 52 in the circumferential direction of the virtual circle R, where the center angle θ1 is 180 degrees.

The width (maximum width) of the flat portion 54 in the left-right direction is defined as a width W1. In addition, the width (maximum width) of the ejection port 44B of the ejection unit 42 in the left-right direction is defined as a width W2. The width W1 is greater than the width W2.

Receded Portion

The receded portion 56 is located on the back side (one side in the second direction) with respect to the virtual axis C, and is located on the upper side (other side in the first direction) with respect to the flat portion 54 as viewed in the left-right direction. The receded portion 56 is formed in a planar shape. The receded portion 56 is inclined such that the back end is located higher than the front end.

The receded portion 56 is a portion of the end surface 52 located between the boundary line A2 and the boundary line A3. The receded portion 56 is provided on the back side with respect to the virtual axis C in the area of a center angle θ2. Specifically, the center angle θ2 is greater than 0 degrees and 40 degrees or less. The receded portion 56 is one example of a suppression portion that suppresses the backward flow of the dust P in the front-back direction toward the supply unit 72.

Figure 5:
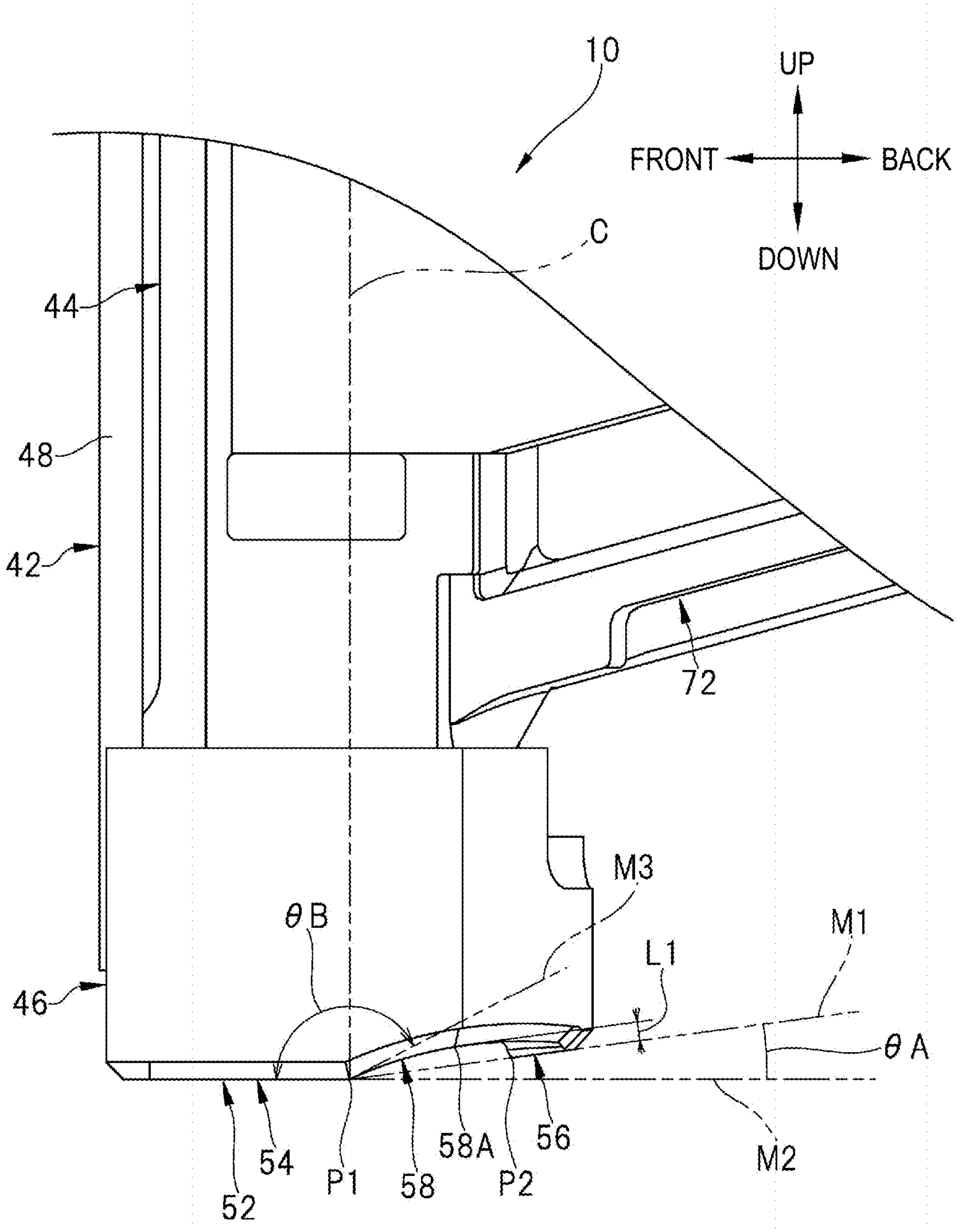
FIG. 5 is an enlarged right side view of the ejection unit of the nailing machine of FIG. 1.

As shown in FIG. 5, when the ejection unit 42 is viewed in the left-right direction, a virtual line connecting a back end position P1 at which the back end (one-side end) of the flat portion 54 in the front-back direction is located and a front end position P2 at which the front end (other-side end) of the receded portion 56 in the front-back direction is located is defined as a virtual line M1. The virtual line M1 may be taken as a virtual plane extending in the left-right direction. The virtual line M1 extends, as viewed in the left-right direction, along an oblique direction crossing a virtual line M2 obtained by extending the flat portion 54 in the front-back direction. The virtual line M2 may be taken as a virtual plane extending in the left-right direction.

An angle formed by the virtual line M1 and the virtual line M2 is defined as an inclination angle θA. The inclination angle θA is, for example, 8 degrees. Note that the inclination angle θA is preferably set to 1 degree or more and 15 degrees or less. The receded portion 56 is located higher than the virtual line M2 as viewed in the left-right direction.

Cutout Portion

As viewed in the left-right direction, the cutout portion 58 is located between the flat portion 54 and the receded portion 56 in the front-back direction, and is located apart upward from the virtual line M1. Moreover, the cutout portion 58 is recessed (cut out) to the upper side in the up-down direction from the receded portion 56 with respect to the virtual line M1. Further, the cutout portion 58 is a curved portion having an arc shape as viewed in the left-right direction. Of the cutout portion 58, a portion having the longest distance L1 from the virtual line M1 as viewed in the left-right direction is defined as a deepest portion 58A. Note that the cutout portion 58 is one example of a discharge portion that guides the dust P (FIG. 4) such that the dust P is discharged in a direction different from the front-back direction.

A virtual line which passes through the back end position P1, which is the boundary point between the flat portion 54 and the cutout portion 58, and is a tangent line to the curved surface of the cutout portion 58 on the front side as viewed in the left-right direction is defined as a virtual line M3. Further, an obtuse angle formed by the flat portion 54 (virtual line M2) and the virtual line M3 as viewed in the left-right direction is defined as an inclination angle θB. The inclination angle θB is, for example, 160 degrees. Note that the inclination angle θB is preferably set to 100 degree or more and 175 degrees or less.

As shown in FIG. 4, the cutout portion 58 has the left cutout portion 59 and the right cutout portion 61, as one example. In other words, the cutout portion 58 is provided on each side of the end surface 52 in the left-right direction.

The left cutout portion 59 is located on the left side with respect to the virtual axis C. The left cutout portion 59 is provided in the area of the end surface 52, where the center angle θ3 is 30 degrees or more and 80 degrees or less. The right cutout portion 61 is located on the right side with respect to the virtual axis C. The right cutout portion 61 is provided in the area of the end surface 52, where the center angle θ4 is 30 degrees or more and 80 degrees or less. The center angle of the cutout portion 58 means the center angle θ3 of the left cutout portion 59 or the center angle θ4 of the right cutout portion 61. That is, the center angle of the cutout portion 58 is not an angle obtained by adding the center angle θ3 and the center angle θ4.

The deepest portion 58A of the cutout portion 58 is provided one for each of the left cutout portion 59 and the right cutout portion 61. The deepest portion 58A is provided within an area of 35 degrees or more and 55 degrees or less in terms of each of the center angle θ3 and the center angle θ4. As one example, the deepest portion 58A is provided at a position at which an angle in the circumferential direction from the flat portion 54 (boundary line A1) is 45 degrees in terms of each of the center angle θ3 and the center angle θ4.

Hole of Push Lever

The push lever 46 has a hole 49 into which the blade guide 44 is to be inserted. The hole 49 has such a shape that an arc portion 49A, a recessed portion 49B, a flat portion 49C, and a recessed portion 49D are arranged in the circumferential direction centered on the virtual axis C.

The arc portion 49A is located on the left side with respect to the virtual axis C. The recessed portion 49B is recessed obliquely backward and rightward (outward in the radial direction) from the virtual axis C. In other words, in a portion of the right cutout portion 61 where the center angle θ4 with respect to the boundary line A1 is around 45 degrees, a thickness in the radial direction is less than a thickness at other positions in the circumferential direction. Moreover, the recessed portion 49B faces, in the radial direction, a portion corresponding to a corner portion of the blade guide 44.

The dust P present between the blade guide 44 and the push lever 46 is guided by the blade guide 44 and the push lever 46, and accordingly, is easily accumulated in the recessed portion 49B. Here, since the recessed portion 49B is a thin portion, the dust P accumulated in the recessed portion 49B is easily discharged to the outside through the right cutout portion 61.

The flat portion 49C is located along the K-direction. The recessed portion 49D is recessed obliquely forward and rightward (outward in the radial direction) from the virtual axis C.

Drive Unit

The drive unit 62 shown in FIG. 1 drives the striking unit 24. Specifically, the drive unit 62 moves the striking unit 24 to a standby position before striking. The drive unit 62 has a motor 64, a speed reduction mechanism 66, and a rotary unit 68. Note that operation of the drive unit 62 is controlled by the control unit 80 to be described later. The drive unit 62 operates by receiving power, and enables the striking unit 24 to move to the upper side against the biasing force of the striking force generation unit 32.

Motor

The motor 64 is housed in the motor housing portion 14. The motor 64 has an output shaft 65 and a not-shown rotor. As one example, the motor 64 is a brushless motor to be operated by power supplied from the battery pack 18. The output shaft 65 extends in the front-back direction.

Speed Reduction Mechanism

The speed reduction mechanism 66 includes a not-shown planetary gear. The output shaft 65 is connected to a pin wheel 69 (FIG. 2) to be described later via the speed reduction mechanism 66.

Rotary Unit

As shown in FIG. 2, the rotary unit 68 includes the pin wheel 69 and a plurality of not-shown pinion pins. The pinion pin can be engaged with the rack of the driver blade 28. The pin wheel 69 rotates by receiving drive force (rotation force) from the motor 64 (FIG. 1). The pin wheel 69 is rotated during a series of striking operation of the nailing machine 10, and the pinion pin and the rack are engaged with each other, thereby moving (lifting) the striking unit 24 after striking to the standby position. In other words, the rotary unit 68 is one example of a winding-up unit that winds the striking unit 24 to the upper side against the biasing force of the striking force generation unit 32 (FIG. 1) by receiving the drive force of the motor 64.

Supply Unit

The supply unit 72 shown in FIG. 1 is located on the back side with respect to the ejection unit 42 in the front-back direction. The supply unit 72 supplies the nail N housed in the magazine 22 to the ejection unit 42. The supply unit 72 is one example of an operation mechanism and one example of a supply mechanism. Specifically, the supply unit 72 includes the feeder 74, a solenoid 76, and a not-shown spring.

The feeder 74 is provided so as to reciprocate along the K-direction. The feeder 74 is provided with a plurality of feeding claws engageable with the plurality of nails N at intervals in the K-direction. The plurality of feeding claws is not shown in the figure. The solenoid 76 has a not-shown coil and a not-shown iron core. The iron core can reciprocate along the K-direction, and the iron core is coupled to the feeder 74. The spring biases the iron core toward one side (back side) in the K-direction to locate the feeder 74 at an initial position.

When magnetic attraction force is generated in the solenoid 76, the iron core moves to the other side (front side) in the K-direction against the biasing force of the spring. Accordingly, the feeder 74 supplies the nail N to the ejection unit 42. In this manner, the feeder 74 supports the nail N such that the nail N is movable toward an ejection position in the ejection unit 42. The solenoid 76 drives the feeder 74.

Control Unit

The control unit 80 shown in FIG. 1 is a microcomputer including a processor and a memory (not shown). The control unit 80 controls operation of each unit of the nailing machine 10. The control unit 80 operates the motor 64 when moving the piston 26 after striking from the bottom dead center to the top dead center.

Features of First Embodiment

Figure 6:
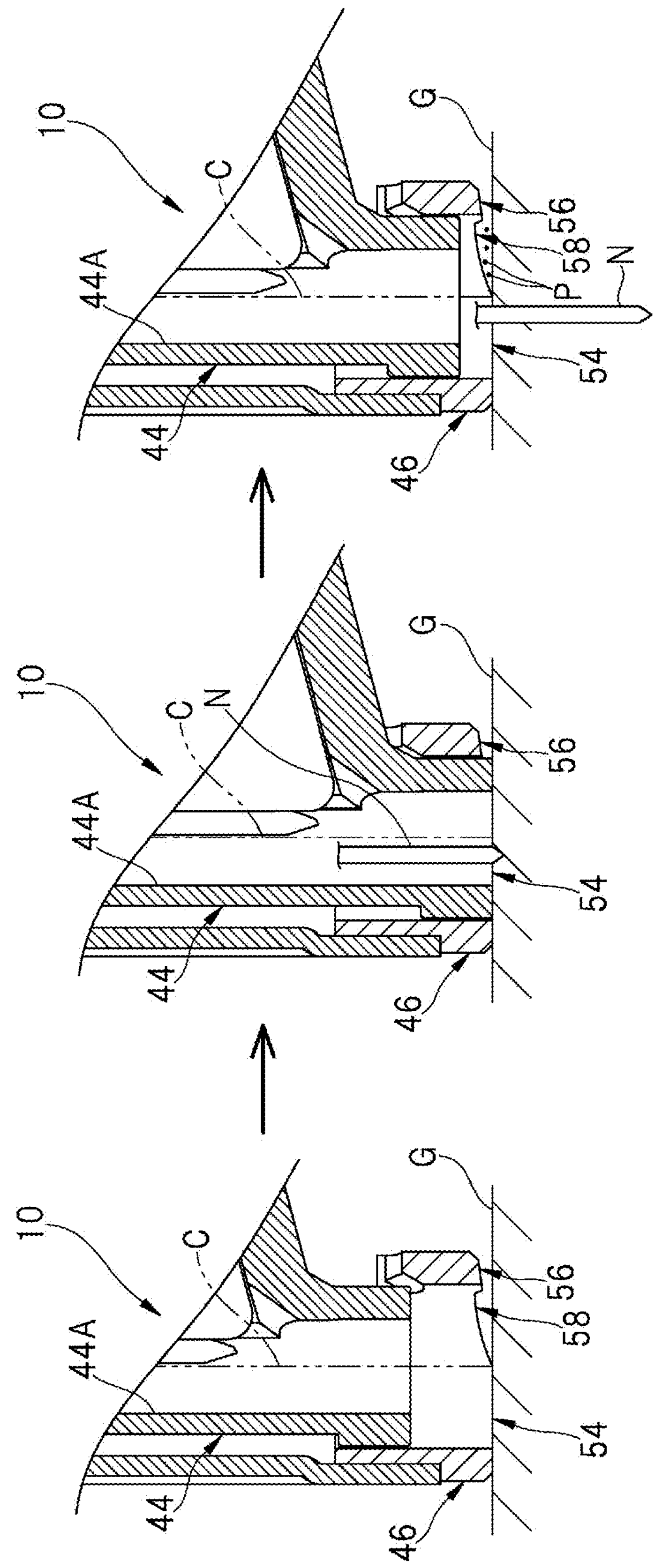
FIG. 6 is a sectional view showing a state of the ejection unit when a push lever of the nailing machine of FIG. 1 comes into contact with a partner member and moves.

As shown in FIG. 6, in the operation of driving the nail N by the nailing machine 10, the push lever 46 is pressed against the partner member G. Specifically, the flat portion 54 of the push lever 46 comes into surface contact with the partner member G. This stabilizes the posture of the nailing machine 10. Then, as the pressing operation by the worker continues, the blade guide 44 moves toward the partner member G. In other words, the blade guide 44 moves relative to the push lever 46. Accordingly, a not-shown switch of the push lever 46 is turned on.

In the nailing machine 10 shown in FIG. 1, when the push lever 46 is ON and the trigger 19 is ON, the control unit 80 operates the motor 64. When the pin wheel 69 (FIG. 2) is rotationally driven and the not-shown pinion pin and rack are engaged with each other, the driver blade 28 is pushed up, and the piston 26 moves from the initial (standby) position to the top dead center. Thereafter, in a state of the not-shown pinion pin and rack being disengaged from each other, the piston 26 receives the biasing force of the striking force generation unit 32 and moves to the lower side. Accordingly, the driver blade 28 moves from the top dead center to the bottom dead center, and strikes the nail N.

When the pin wheel 69 is continuously rotationally driven after the nail N has been struck, the pinion pin and the rack are engaged with each other again. Accordingly, the driver blade 28 moves from the bottom dead center to the initial position. That is, the piston 26 reciprocates once between the bottom dead center and the top dead center, and the driver blade 28 strikes the nail N accordingly, so that the nail N is ejected from the ejection unit 42.

As shown in FIG. 6, when the nail N is driven into the partner member G, the dust P is generated in the vicinity of a portion of the partner member G into which the nail N is driven. At this time, although the push lever 46 is in contact with the partner member G, the blade guide 44 tends to move to the upper side by receiving reaction at the time of the driving operation. Thus, a gap may be generated between a lower portion of the blade guide 44 and the partner member G.

Figure 7:
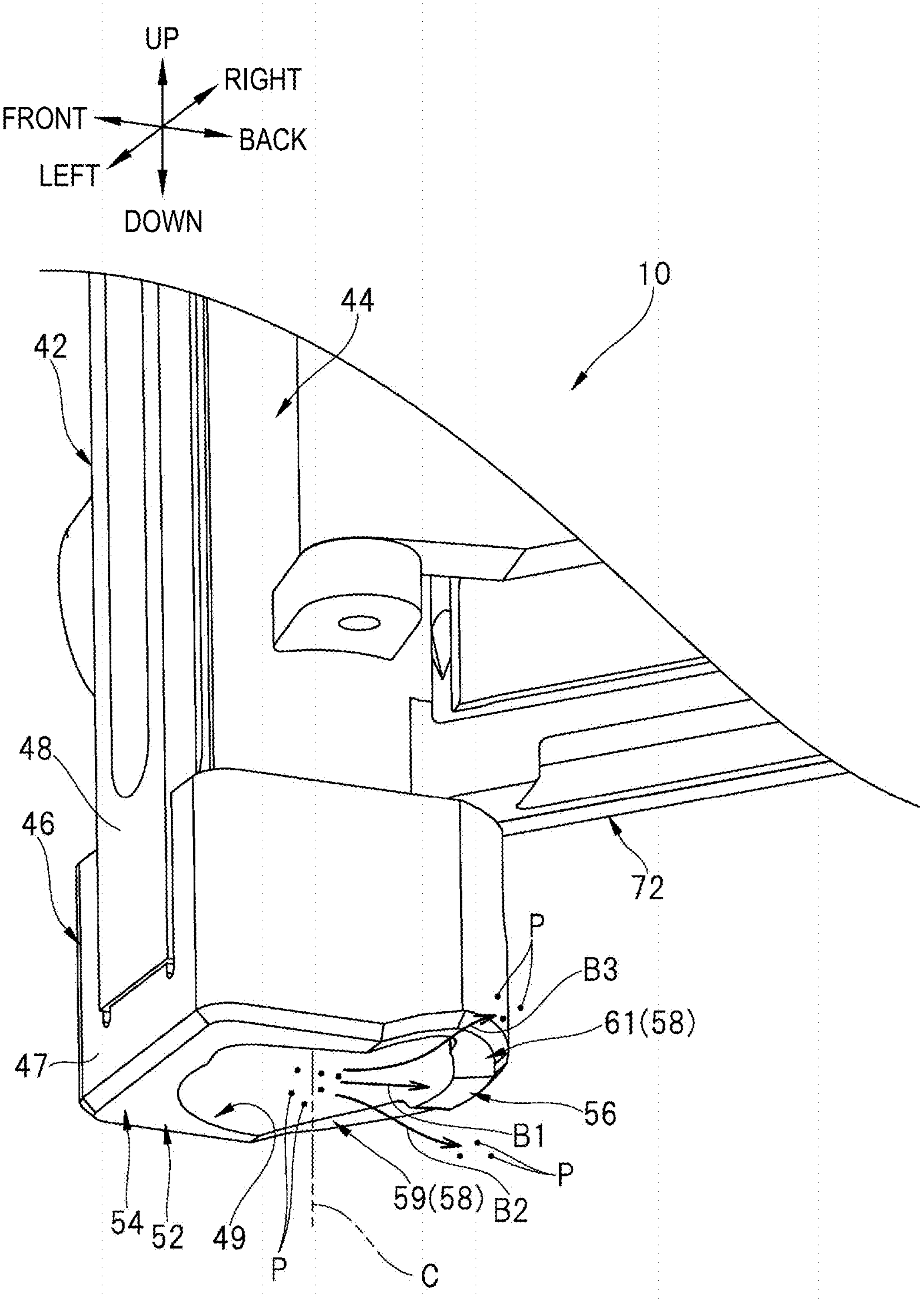
FIG. 7 is a perspective view showing a state of dust being discharged from a cutout portion of the nailing machine of FIG. 1.

As shown in FIG. 7, movement of the dust P generated on the front side with respect to the virtual axis C inside the hole 49 is limited by being surrounded by the flat portion 54 and the partner member G (FIG. 6), and therefore, the dust P tends to move to the back side with respect to the virtual axis C. Here, as indicated by an arrow B1, movement of part of the dust P present on the back side with respect to the virtual axis C to the back side is limited by contact with an edge portion (inner portion) of the receded portion 56. Thus, the dust P is less likely to flow toward the supply unit 72 located on the back side with respect to the ejection unit 42. That is, contamination of the supply unit 72 with the dust P is suppressed.

In the ejection unit 42, the cutout portion 58 is provided between the flat portion 54 and the receded portion 56. Thus, as indicated by arrows B2, B3, the dust P passes through the cutout portion 58 (left cutout portion 59 and right cutout portion 61), and is discharged to the outside of the ejection unit 42 (push lever 46). As one example, the dust P is discharged in a direction at an angle of 45 degrees with respect to the front-back direction. As described above, even if the gap is generated between the blade guide 44 having received the reaction and the partner member G (FIG. 6), the dust P is discharged to the outside through the cutout portion 58, so that entrance of the dust P into the ejection path 44A (FIG. 4) can be suppressed.

SUMMARY

The features of the nailing machine 10 are summarized with reference to FIGS. 1 to 7. Note that description of individual figure numbers will be omitted.

In the nailing machine 10, the supply unit 72 is located on the back side with respect to the ejection unit 42. The partner member G into which the nail N is to be driven faces the ejection unit 42 in the up-down direction.

The striking unit 24 strikes the nail N and the ejection unit 42 ejects the nail N to the lower side along the virtual axis C, and in this manner, the nail N is driven into the partner member G. At this time, in the ejection unit 42, the dust P may be generated as the nail N is ejected (driven). Since the generated dust P hardly flows between the partner member G and the flat portion 54, the dust P tends to flow to the back side from between the partner member G and the receded portion 56. Movement of part of the dust P flowing to the back side is suppressed by contact with the edge portion of the receded portion 56.

Further, the cutout portion 58 is located between the flat portion 54 and the receded portion 56 in the front-back direction. The cutout portion 58 is located apart from the virtual line M1 connecting the flat portion 54 and the receded portion 56. In other words, the size of a space between the partner member G and the cutout portion 58 is greater than the size of a space between the partner member G and the receded portion 56. Thus, the flow rate of air flowing through the cutout portion 58 forms a great amount of an air flow discharged from the ejection path 44A, and the flow rate of air flowing through the receded portion 56 is less than the flow rate of air flowing through the cutout portion 58. Thus, when the dust P flows to the back side, the dust P is discharged outward from the cutout portion 58. Consequently, it is possible to suppress the dust P from flowing toward the back side on which the supply unit 72 is located.

As described above, according to the nailing machine 10, the flow of the dust P from the ejection unit 42 to the supply unit 72 can be suppressed, and the dust P can be easily discharged from the ejection unit 42 to the outside. Thus, the convenience of the nailing machine 10 is improved.

In the nailing machine 10, the cutout portion 58 is recessed to above the receded portion 56 with respect to the virtual line M1. Thus, a space formed by the virtual line M1 (virtual plane) and the cutout portion 58 is greater than a space formed by the virtual line M1 and the receded portion 56, so that more dust P can be discharged from the cutout portion 58 to the outside.

In the nailing machine 10, the cutout portion 58 (left cutout portion 59 and right cutout portion 61) are provided on both sides in the left-right direction, and therefore, it is possible to easily discharge the dust P from between the partner member G and the end surface 52 to the outside as compared with a configuration in which the cutout portion 58 is provided only on one side in the left-right direction.

In the nailing machine 10, the cutout portion 58 is provided within the area where each of the center angle θ3 and the center angle θ4 is 30 degrees or more and 80 degrees or less. In other words, the cutout portion 58 is opened in the oblique direction crossing the front-back direction, and the dust P hardly flows in the left-right direction or the front-back direction. Thus, in the nailing machine 10, the dust P is discharged in the oblique direction from the cutout portion 58, and therefore, it is possible to further suppress the dust P from flowing to the supply unit 72 located on the back side with respect to the ejection unit 42.

In the nailing machine 10, the portion of the cutout portion 58 having the longest distance L1 from the virtual line M1 is the portion having the greatest size of the opening through which the dust P is discharged. Here, the portion having the longest distance L1 from the virtual line M1 is located within the area where the center angle is 35 degrees or more and 55 degrees or less. Thus, the portion having the greatest size of the opening is at the position apart from each of the flat portion 54 and the receded portion 56 at a substantially equal distance. In other words, the deepest portion of the cutout portion 58 is at the position separated from the boundary line A1 by a center angle of 45 degrees. Thus, the dust P can be discharged to the outside from the cutout portion 58 while avoiding locations, such as the flat portion 54 and the receded portion 56, which limit the flow of the dust P.

In the nailing machine 10, the flat portion 54 is provided in the area where the center angle θ1 is 180 degrees or more. Thus, the area of contact between the flat portion 54 and the partner member G is greater as compared with a case where the center angle is less than 180 degrees, so that the posture of the nailing machine 10 when the nail N is struck can be easily stabilized.

Further, in the nailing machine 10, the flat portion 54 is provided in the area where the center angle θ1 is 180 degrees. Thus, the front side of the end surface 52 with respect to the virtual axis C (center axis) is entirely the flat portion 54, so that the posture of the nailing machine 10 can be easily stabilized. In addition, the receded portion 56 and the cutout portion 58 are located on the back side of the end surface 52 with respect to the virtual axis C, and therefore, a space for discharging the dust P can be ensured as compared with a configuration in which the center angle θ1 is greater than 180 degrees.

In the nailing machine 10, the width W1 of the flat portion 54 in the left-right direction is greater than the width W2 of the ejection port 44B in the left-right direction. Thus, the flat portion 54 and the partner member G can be brought into contact with each other over a wide area in the left-right direction, and therefore, the posture of the nailing machine 10 can be stabilized and the nailing machine 10 can be easily slid in the front-back direction or the left-right direction.

In the nailing machine 10, the handle 15 is located on the back side with respect to the ejection unit 42 as viewed in the up-down direction. On the other hand, the flat portion 54 is provided on the front side of the ejection unit 42. Thus, even if external force causing an upper portion of the nailing machine 10 to tilt to the front side acts on the ejection unit 42 when the worker holds the handle 15, the flat portion 54 comes into contact with the partner member G and resists the external force, so that the posture of the nailing machine 10 can be easily maintained and the nailing machine 10 can be easily slid in the front-back direction or the left-right direction.

In the nailing machine 10, the end surface 52 is provided at the push lever 46. In other words, the end surface 52 is not provided at the blade guide 44. When the blade guide 44 moves relative to the push lever 46 in response to the reaction, the dust P tends to move along with relative movement of the blade guide 44. At this time, the contact state between the push lever 46 and the partner member G is maintained.

Here, the end surface 52 of the push lever 46 is provided with the cutout portion 58. Thus, the dust P present in the vicinity of the push lever 46 can be discharged to the outside of the push lever 46 through the cutout portion 58. Consequently, it is possible to suppress the dust P from entering the ejection path 44A.

In the nailing machine 10, the supply unit 72 is located on the back side with respect to the ejection unit 42. The partner member G into which the nail N is to be driven faces the ejection unit 42 in the up-down direction. The striking unit 24 strikes the nail N by receiving the biasing force from the striking force generation unit 32, and the nail N is driven into the partner member G by the ejection unit 42 ejecting the nail N to the lower side. In the ejection unit 42, the dust P may be generated as the nail Nis ejected.

Here, the receded portion 56 of the end surface 52 suppresses the dust P from flowing to the back side toward the supply unit 72. Then, the cutout portion 58 guides the dust P such that the dust P is discharged in the direction different from the front-back direction. As described above, in the nailing machine 10, the flow of the dust P from the ejection unit 42 to the supply unit 72 can be suppressed, and the dust P can be easily discharged from the ejection unit 42. Thus, the convenience of the nailing machine 10 is improved.

Configuration of Second Embodiment

A nailing machine 90 will be described as a working machine according to the second embodiment. Note that the same reference signs are used to denote the same or similar configurations as those of the nailing machine 10 (FIG. 1) according to the first embodiment, and description thereof will be omitted.

Figure 8:
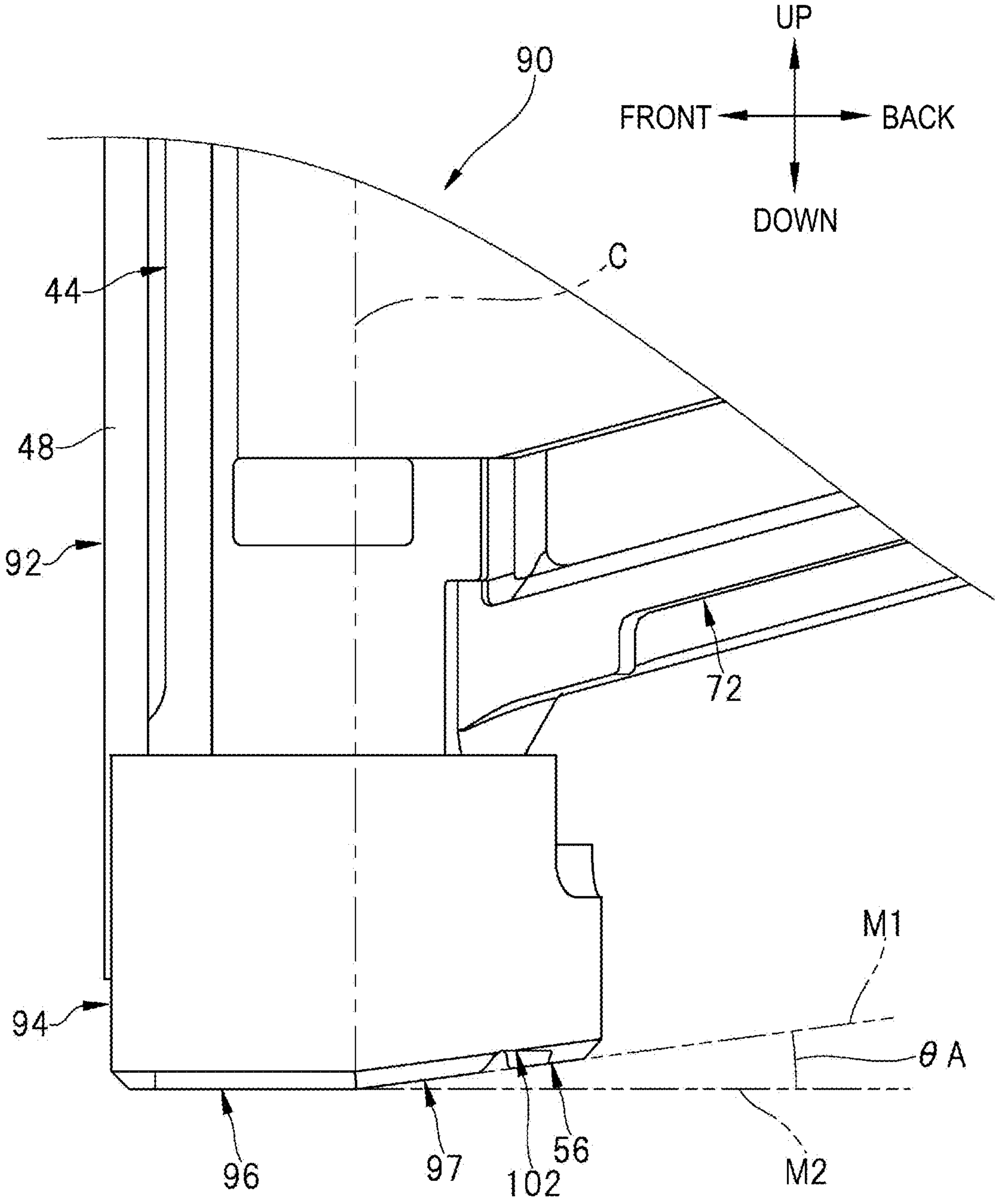
FIG. 8 is a right side view showing an ejection unit of a nailing machine according to a second embodiment.

FIG. 8 shows an ejection unit 92 of the nailing machine 90. The configuration of the nailing machine 90 is made such that the ejection unit 42 (FIG. 1) of the nailing machine 10 is replaced with the ejection unit 92. Configurations other than the ejection unit 92 are similar to those of the nailing machine 10.

Ejection Unit

The ejection unit 92 is located on the lower side with respect to the cylinder housing portion 13 (FIG. 1). The ejection unit 92 ejects the nail N struck by the striking unit 24 (FIG. 1) to the lower side from the ejection path 44A (FIG. 1). Specifically, the ejection unit 92 includes the blade guide 44 and a push lever 94 movable in the up-down direction along the blade guide 44.

The push lever 94 is one example of a movable portion provided movably in the up-down direction relative to the blade guide 44. The push lever 94 is different in that the end surface 52 (FIG. 5) of the push lever 46 (FIG. 5) is replaced with an end surface 96. Configurations other than the end surface 96 are similar to those of the push lever 46, and therefore, description thereof will be omitted.

End Surface of Ejection Unit

Figure 9:
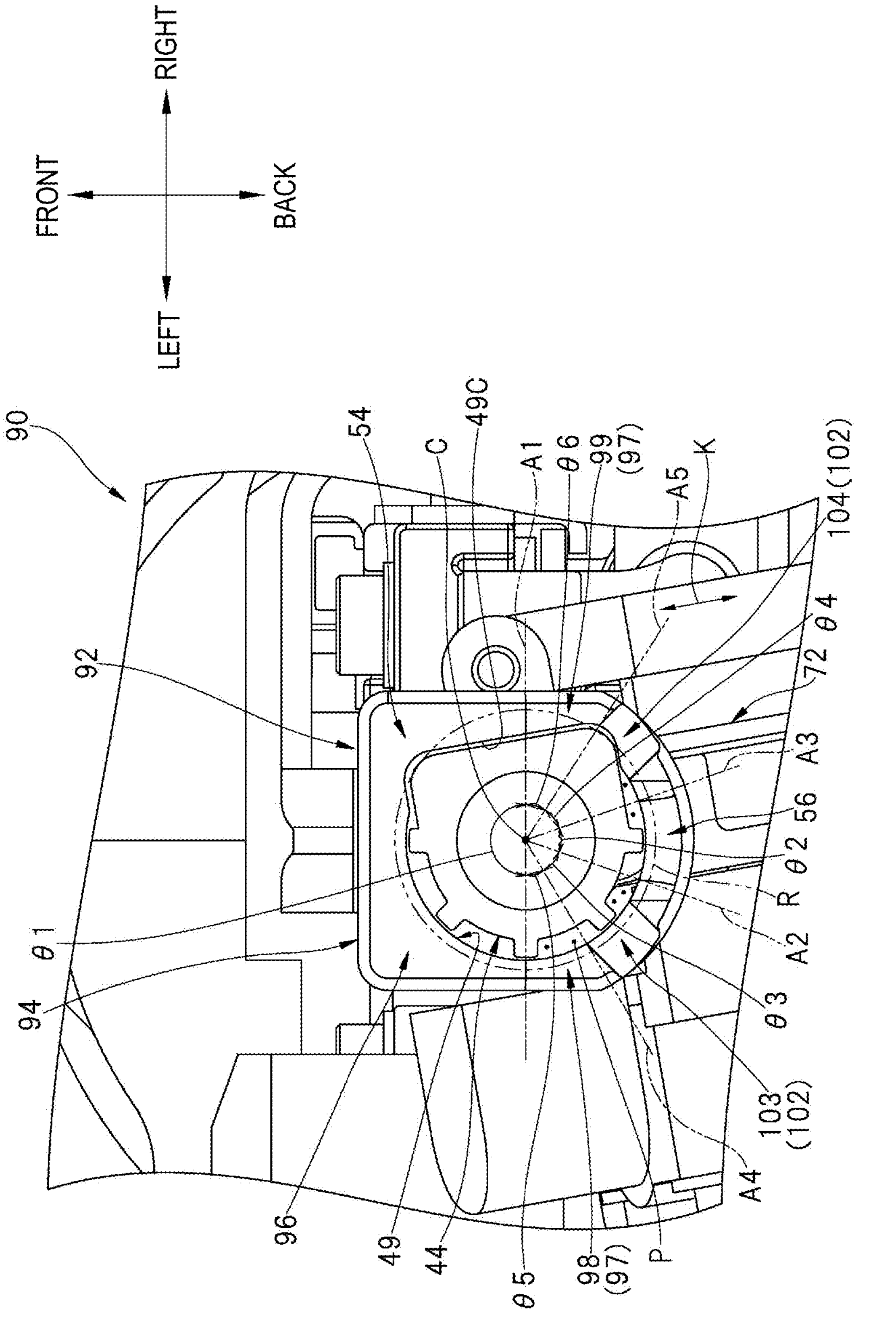
FIG. 9 is an enlarged bottom view of the ejection unit of the nailing machine of FIG. 8.

FIG. 9 shows the state of a lower end portion of the ejection unit 92 from the lower side. The end surface 96 has the flat portion 54, the receded portion 56, an inclined portion 97, and a cutout portion 102. Further, FIG. 9 shows a boundary line A4 and a boundary line A5 in addition to the boundary line A1, the boundary line A2, and the boundary line A3.

The boundary line A1 represents a virtual boundary between the flat portion 54 and the inclined portion 97. The boundary line A2 represents a virtual boundary between a left cutout portion 103 to be described later and the receded portion 56. The boundary line A3 represents a virtual boundary between a right cutout portion 104 to be described later and the receded portion 56. The boundary line A4 represents a virtual boundary between a left inclined portion 98 to be described later and the left cutout portion 103. The boundary line A5 represents a virtual boundary between a right inclined portion 99 to be described later and the right cutout portion 104.

An area where each of the flat portion 54, the receded portion 56, the inclined portion 97, and the cutout portion 102 is provided will be represented using a center angle. Specifically, when the end surface 96 is viewed from the lower side in the up-down direction, the area of each of the flat portion 54, the receded portion 56, the inclined portion 97, and the cutout portion 102 is represented using the center angle (in units of degree) of the virtual circle R centered on one point on the virtual axis C.

Inclined Portion

The inclined portion 97 is located on the back side with respect to the virtual axis C, and is located on the upper side with respect to the flat portion 54. The inclined portion 97 is formed in a planar shape. The inclined portion 97 is inclined such that the back end is located higher than the front end. As one example, the inclined portion 97 has the left inclined portion 98 and the right inclined portion 99. In other words, the inclined portion 97 is provided on each side of the end surface 96 in the left-right direction.

The left inclined portion 98 is located on the back side and the left side of the end surface 96 with respect to the virtual axis C. Moreover, the left inclined portion 98 is provided in an area where the angle thereof with respect to the boundary line A1 in the circumferential direction of the virtual circle R is a center angle θ5. Specifically, the center angle θ5 is set in a range of greater than 0 degrees and 40 degrees or less.

The right inclined portion 99 is located on the back side and the right side of the end surface 96 with respect to the virtual axis C. Moreover, the right inclined portion 99 is provided in an area where the angle thereof with respect to the boundary line A1 in the circumferential direction of the virtual circle R is a center angle θ6. Specifically, the center angle θ6 is set in a range of greater than 0 degrees and 40 degrees or less.

As shown in FIG. 8, the angle formed by the inclined portion 97 and the virtual line M2 as viewed in the left-right direction is the inclination angle θA, for example. In other words, the inclined portion 97 and the receded portion 56 are located on the virtual line M1 as viewed in the left-right direction. So that, inclined portion 97 can be considered to include the receded portion 56 as a part of the inclined portion 97.

Cutout Portion

As shown in FIG. 9, the cutout portion 102 is located between the inclined portion 97 and the receded portion 56 in the circumferential direction of the virtual circle R, and is located apart upward from the virtual line M1 (FIG. 8). Moreover, the cutout portion 102 is recessed (cut out) to the upper side in the up-down direction from the receded portion 56 with respect to the virtual line M1. Further, the cutout portion 102 is cut out in a trapezoidal shape as viewed in the left-right direction. The cutout portion 102 is one example of a discharge portion that guides the dust P such that the dust P is discharged in the direction different from the front-back direction.

The cutout portion 102 has the left cutout portion 103 and the right cutout portion 104, as one example. In other words, the cutout portion 102 is provided on each side of the end surface 96 in the left-right direction.

The left cutout portion 103 is located on the left side with respect to the virtual axis C. The left cutout portion 103 is provided in the area of the end surface 96, where the center angle θ3 is 30 degrees or more and 80 degrees or less. The right cutout portion 104 is located on the right side with respect to the virtual axis C. The right cutout portion 104 is provided in the area of the end surface 96, where the center angle θ4 is 30 degrees or more and 80 degrees or less. The center angle of the cutout portion 102 means the center angle θ3 of the left cutout portion 103 or the center angle θ4 of the right cutout portion 104. In a portion of the right cutout portion 104 where the center angle θ4 with respect to the boundary line A1 is around 45 degrees, a thickness in the radial direction is less than a thickness at other positions in the circumferential direction of the virtual circle R.

Features of Second Embodiment

Figure 10:
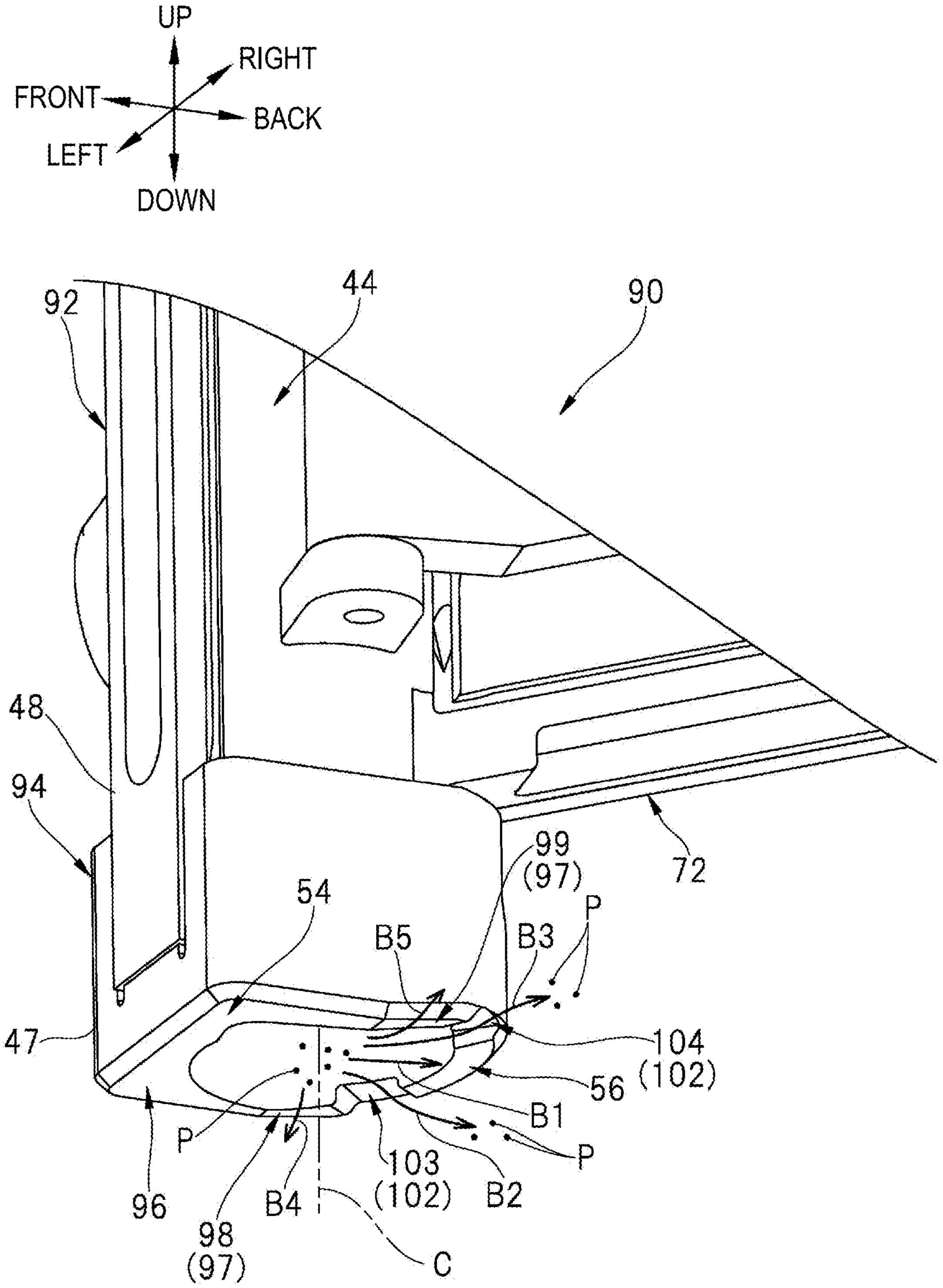
FIG. 10 is a perspective view of the ejection unit of the nailing machine of FIG. 9 as viewed obliquely from below.

In the nailing machine 90 shown in FIG. 10, when the nail N (FIG. 1) is driven into the partner member G (FIG. 1), the dust P swirls. Movement of the dust P generated on the front side with respect to the virtual axis C is limited by the flat portion 54 and the partner member G, and therefore, the dust P tends to flow to the back side with respect to the virtual axis C. As indicated by an arrow B1, backward movement of part of the dust P generated on the back side with respect to the virtual axis C is limited by contact with the edge portion (inner portion) of the receded portion 56. Thus, the dust P is less likely to flow toward the supply unit 72 located on the back side with respect to the ejection unit 92.

In the ejection unit 92, the cutout portion 102 is provided between the flat portion 54 and the receded portion 56. Thus, as indicated by arrows B2, B3, the dust P passes through the cutout portion 102 (left cutout portion 103 and right cutout portion 104), and is discharged to the outside of the ejection unit 92 (push lever 94). Thus, even when the gap is generated between the blade guide 44 and the partner member G due to the reaction, it is possible to suppress the dust P from entering the ejection path 44A (FIG. 1).

As described above, according to the nailing machine 90, the flow of the dust P from the ejection unit 92 to the supply unit 72 can be reduced, and the dust P can be easily discharged from the ejection unit 92 to the outside. Thus, the convenience of the nailing machine 90 is improved.

Further, in the nailing machine 90, the inclined portion 97 is located between the flat portion 54 and the cutout portion 102 in the circumferential direction of the end surface 96. Thus, while the dust P is guided toward the cutout portion 102, the dust P can be discharged outward in the left-right direction from between the inclined portion 97 and the partner member G as indicated by arrows B4, B5.

Configuration of Third Embodiment

A nailing machine 110 will be described as a working machine according to the third embodiment. Note that the same reference signs are used to denote the same or similar configurations as those of the nailing machine 10 (FIG. 1) and the nailing machine 90 (FIG. 8) according to the first and second embodiments, and description thereof will be omitted.

Figure 11:
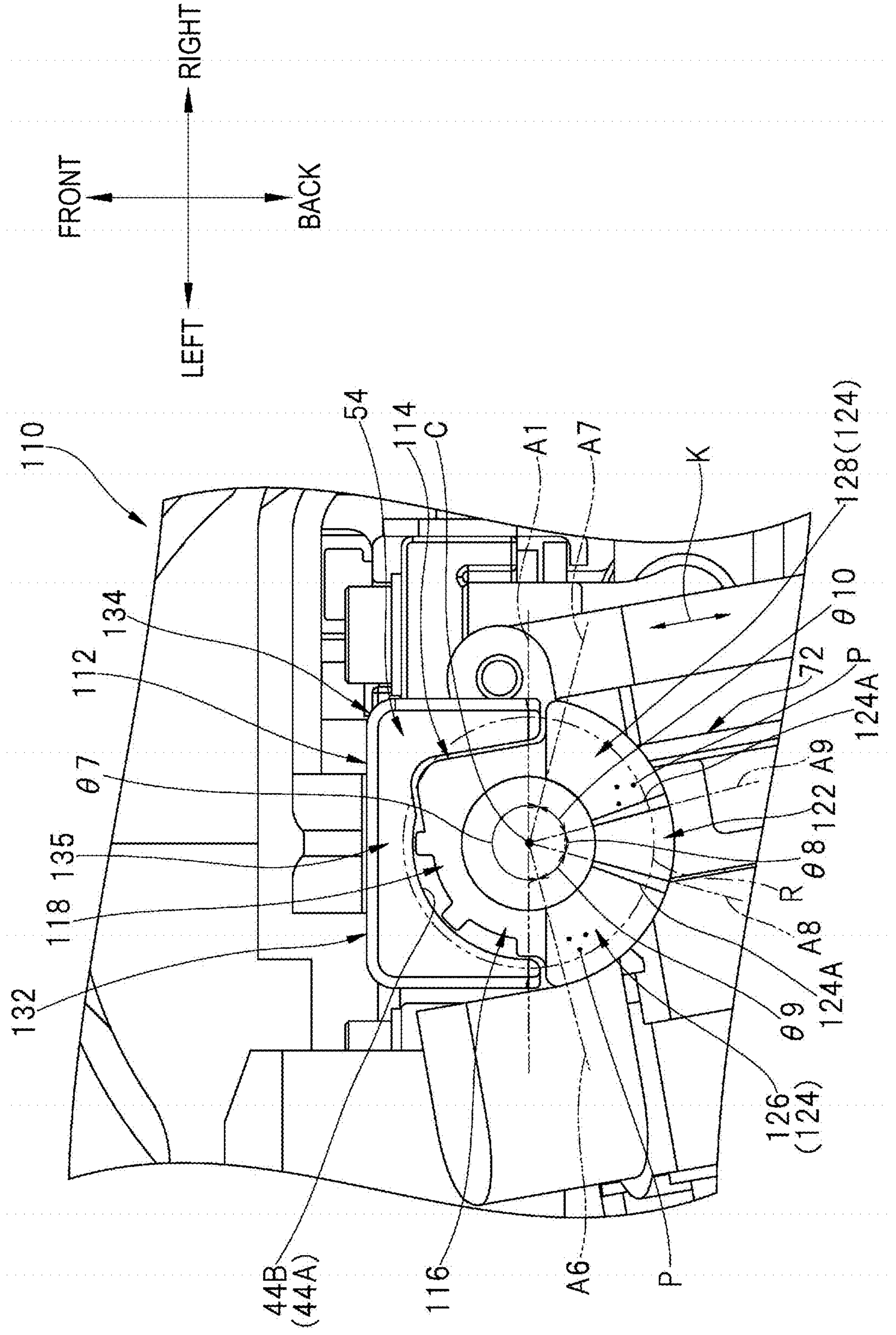
FIG. 11 is an enlarged bottom view of an ejection unit of a nailing machine according to a third embodiment.

FIG. 11 shows an ejection unit 112 of the nailing machine 110. The nailing machine 110 is configured such that the ejection unit 42 (FIG. 1) of the nailing machine 10 is replaced with the ejection unit 112. Configurations other than the ejection unit 112 are similar to those of the nailing machine 10.

Ejection Unit

The ejection unit 112 ejects the nail N (FIG. 1) struck by the striking unit 24 (FIG. 1) to the lower side from the ejection path 44A. Specifically, the ejection unit 112 includes a blade guide 114 and a push lever 132 movable in the up-down direction along the blade guide 114.

Blade Guide

The blade guide 114 is one example of a base portion defining the ejection path 44A. The blade guide 114 is formed in a tubular shape with the virtual axis C as a center axis. The ejection path 44A and the ejection port 44B are provided inside the blade guide 114. The blade guide 114 guides the driver blade 28 (FIG. 1) in the up-down direction. An end surface 116 is provided at the lower end of the blade guide 114. In other words, the ejection unit 112 has the end surface 116 located at a lower end portion in the up-down direction. The end surface 116 is provided only at the blade guide 114. Note that details of the end surface 116 will be described later.

Push Lever

The push lever 132 is one example of a movable portion provided movably in the up-down direction relative to the blade guide 44. Specifically, the push lever 132 is located outside and on the front side of the blade guide 44. The push lever 132 is biased to the lower side by a not-shown spring.

When pressed against the partner member G (FIG. 1), the push lever 132 moves to the upper side against the biasing force of the spring. At this time, a predetermined signal is output to the control unit 80 (FIG. 1). The push lever 132 has a contact portion 134 in contact with the partner member G and the plate portion 48 (FIG. 12) extending to the upper side from the front end of the contact portion 134. The contact portion 134 and the plate portion 48 are integrally formed.

The contact portion 134 is located on the front side with respect to the virtual axis C. The contact portion 134 has a U-shaped outer shape which opens backward as viewed in the up-down direction. In other words, the shape of the push lever 132 is not a tubular shape. The push lever 132 surrounds (covers) a front portion of the blade guide 114 from the front, but does not surround (cover) a back portion of the blade guide 114. The lower surface 135 of the contact portion 134 has the flat portion 54, as one example. In the nailing machine 110, the flat portion 54 and the partner member G come into contact with each other, and therefore, the posture when the nail N is driven into the partner member G is easily maintained.

End Surface of Ejection Unit

The end surface 116 has a flat portion 118, a receded portion 122, and a cutout portion 124. A virtual line connecting the virtual axis C and the innermost left end of the flat portion 118 is defined as a boundary line A6. A virtual line connecting the virtual axis C and the innermost right end of the flat portion 118 is defined as a boundary line A7.

An area where each of the flat portion 118, the receded portion 122, and the cutout portion 124 is provided will be represented using a center angle. Specifically, when the end surface 116 is viewed from the lower side in the up-down direction, the area of each of the flat portion 118, the receded portion 122, and the cutout portion 124 is represented using the center angle (in units of degree) of the virtual circle R centered on one point on the virtual axis C.

Flat Portion

The flat portion 118 includes a portion located on the front side with respect to the virtual axis C and a portion located on the back side. The flat portion 118 extends so as to surround the virtual axis C. The flat portion 118 is a planar portion orthogonal to the up-down direction. The area where the flat portion 118 is provided is an area with a center angle θ7 from the boundary line A6 to the boundary line A7 in the circumferential direction of the virtual circle R. The center angle θ7 is about 220 degrees, as one example. In other words, both end portions of the flat portion 118 in the circumferential direction extend to the back side beyond the virtual axis C. The boundary line A6 represents a boundary between the flat portion 118 and a left cutout portion 126 to be described later. The boundary line A7 represents a boundary between the flat portion 118 and a right cutout portion 128 to be described later.

Receded Portion

The receded portion 122 is located on the back side with respect to the virtual axis C, and is located on the upper side with respect to the flat portion 118 as viewed in the left-right direction. The receded portion 122 is formed in a planar shape. The receded portion 122 is located along the front-back direction. The receded portion 122 is provided on the back side with respect to the virtual axis C in the area of the end surface 116 with a center angle θ8 in the circumferential direction of the virtual circle R. The center angle θ8 is a center angle from a boundary line A8 to a boundary line A9. Specifically, the center angle θ8 is set in a range of greater than 0 degrees and 40 degrees or less. The receded portion 122 is one example of a suppression portion that suppresses the backward flow of the dust P toward the supply unit 72.

Figure 12:
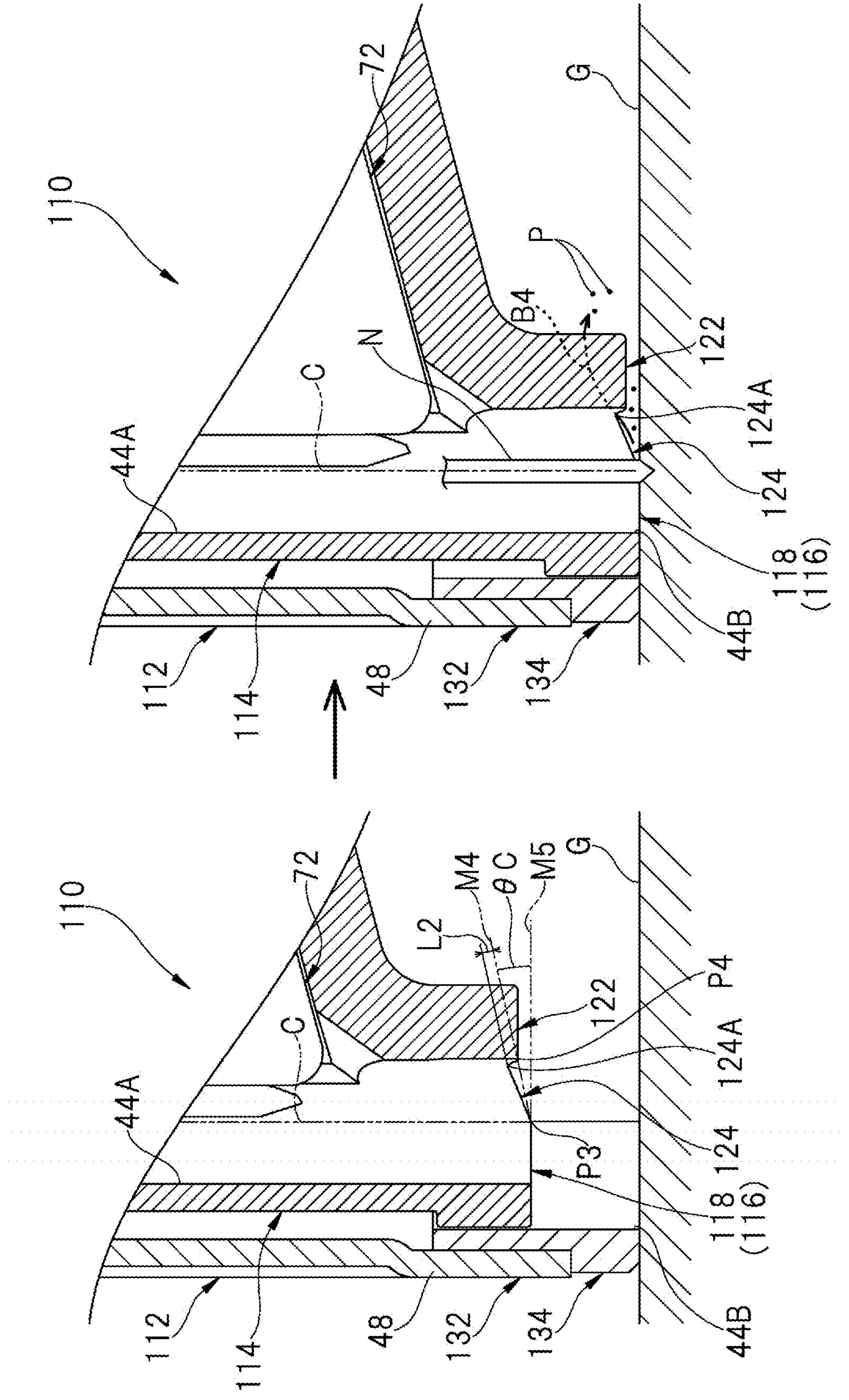
FIG. 12 is a sectional view showing a state of the ejection unit when a push lever of the nailing machine of FIG. 11 comes into contact with a partner member and moves.

As shown in FIG. 12, when the ejection unit 112 is viewed in the left-right direction, a virtual line connecting the back end position P3 of the flat portion 118 and the front end position P4 of the receded portion 122 is defined as a virtual line M4. The virtual line M4 may be taken as a virtual plane extending in the left-right direction. The virtual line M4 extends along an oblique direction crossing a virtual line M5 obtained by extending the flat portion 118 in the front-back direction. As viewed in the left-right direction, an angle formed by the virtual line M4 and the virtual line M5 is defined as an inclination angle θC. The receded portion 122 is located higher than the virtual line M5.

Cutout Portion

As shown in FIG. 11, the cutout portion 124 is located between the flat portion 118 and the receded portion 122 in the circumferential direction of the virtual circle R, and is located apart upward from the virtual line M4 (FIG. 12). The cutout portion 124 is recessed to above the receded portion 122 with respect to the virtual line M4. Further, the cutout portion 124 is cut out in a triangular shape as viewed in the left-right direction. Of the cutout portion 124, a portion having the longest distance L2 (FIG. 12) from the virtual line M4 is defined as a deepest portion 124A. Note that the cutout portion 124 is one example of a discharge portion that guides the dust P such that the dust P is discharged in a direction different from the front-back direction.

The cutout portion 124 has the left cutout portion 126 and the right cutout portion 128, as one example. In other words, the cutout portion 124 is provided on each side of the end surface 116 in the left-right direction.

The left cutout portion 126 is located on the left side with respect to the virtual axis C. The left cutout portion 126 is provided in the area of the end surface 116, where a center angle θ9 is 30 degrees or more and 80 degrees or less. The right cutout portion 128 is located on the right side with respect to the virtual axis C. The right cutout portion 128 is provided in the area of the end surface 116, where a center angle θ10 is 30 degrees or more and 80 degrees or less. The center angle of the cutout portion 124 means the center angle θ9 of the left cutout portion 126 or the center angle θ10 of the right cutout portion 128.

The deepest portion 124A of the cutout portion 124 is provided one for each of the left cutout portion 126 and the right cutout portion 128. The deepest portion 124A is provided within an area of 35 degrees or more and 55 degrees or less in terms of each of the center angle θ9 and the center angle θ10. As one example, the deepest portion 124A is provided at a position at which each of the center angle θ9 and the center angle θ10 is 45 degrees with respect to the boundary line A1.

Features of Third Embodiment

In the nailing machine 110 shown in FIG. 12, when the nail N is driven into the partner member G, the dust P swirls.

Movement of the dust P generated on the front side with respect to the virtual axis C is limited by the flat portion 118 and the partner member G, and therefore, the dust P tends to flow to the back side with respect to the virtual axis C. Backward movement of part of the dust P generated on the back side with respect to the virtual axis C is limited by contact with the edge portion (inner portion) of the receded portion 122. Thus, the dust P is less likely to flow toward the supply unit 72 located on the back side with respect to the ejection unit 112.

In the ejection unit 112, the cutout portion 124 is formed between the flat portion 118 and the receded portion 122. Thus, as indicated by an arrow B4, the dust P passes through the cutout portion 124, and is discharged to the outside of the ejection unit 112 (push lever 132). Thus, even when a gap is generated between the blade guide 114 and the partner member G, it is possible to suppress the dust P from entering the ejection path 44A.

As described above, according to the nailing machine 110, the flow of the dust P from the ejection unit 112 to the supply unit 72 can be suppressed, and the dust P can be easily discharged from the ejection unit 112 to the outside. Thus, the convenience of the nailing machine 110 is improved.

Further, in the nailing machine 110, the cutout portion 124 is provided in the end surface 116 of the blade guide 114. Thus, the dust P present in the vicinity of the ejection port 44B can be discharged from the ejection path 44A to the outside through the cutout portion 124.

Modifications of Present Embodiment

The present embodiment is not limited to the first, second, and third embodiments described above, and various changes can be made without departing from the gist thereof, needless to say. Hereinafter, modifications of the present embodiment will be described. Note that modifications of common elements in the nailing machine 10, the nailing machine 90, and the nailing machine 110 will be described using the nailing machine 10.

In the nailing machine 10, part of the cutout portion 58 may protrude to below the virtual line M1. The cutout portion 58 may be provided only on one of the right side or the left side of the end surface 52. The end surface 52 may be provided at both the blade guide 44 and the push lever 46.

The center angle θ3 and center angle θ4 of the cutout portion 58 may be less than 30 degrees or greater than 80 degrees. The portion of the cutout portion 58 having the longest distance L1 from the virtual line M1 may be provided in an area where the center angle θ3 and the center angle θ4 are less than 35 degrees or greater than 55 degrees.

The flat portion 54 may be provided in the area of the end surface 52, where the center angle θ1 is less than 180 degrees. In the case of the configuration in which the blade guide 44 is provided with the cutout portion, the width W1 of the flat portion 54 in the left-right direction may be less than the width W2 of the ejection port 44B in the left-right direction.

The handle 15 may be provided at a position overlapping with the ejection unit 42 as viewed in the up-down direction.

The operation mechanism is not limited to one having the solenoid 76, and may be, for example, one that drives a feeder using a motor.

What is claimed is:

1. A working machine comprising:

a striking unit that strikes a fastener;

an injection unit that ejects the fastener struck by the striking unit to one side in a first direction along a virtual axis extending in the first direction; and an operation mechanism located on one side in a second direction orthogonal to the first direction with respect to the injection unit, wherein the injection unit has an end surface located at an end portion on the one side in the first direction, and the end surface has a flat portion located on the other side in the second direction with respect to the virtual axis and extending so as to surround the virtual axis, a receded portion located on the one side in the second direction with respect to the virtual axis and located on the other side in the first direction with respect to the flat portion, and a cutout portion located between the flat portion and the receded portion in the second direction and located apart from a virtual line connecting an end of the flat portion on the one side in the second direction and an end of the receded portion on the other side in the second direction as viewed in a third direction orthogonal to both the first direction and the second direction.

2. The working machine according to claim 1, wherein the cutout portion is recessed to the other side in the first direction from the receded portion with respect to the virtual line as viewed in the third direction.

3. The working machine according to claim 1, wherein the cutout portion is provided on each side of the end surface in the third direction.

4. The working machine according to claim 1, wherein when the end surface is viewed in the first direction from the one side in the first direction and an area is expressed using a center angle of a virtual circle centered on one point on the virtual axis, the cutout portion is provided in an area of the end surface where the center angle is 30 degrees or more and 80 degrees or less.

5. The working machine according to claim 4, wherein a portion of the cutout portion having a longest distance from the virtual line is provided in an area where the center angle is 35 degrees or more and 55 degrees or less.

6. The working machine according to claim 4, wherein the flat portion is provided in an area of the end surface where the center angle is 180 degrees or more.

7. The working machine according to claim 6, wherein the flat portion is provided in an area of the end surface where the center angle is 180 degrees.

8. The working machine according to claim 1, wherein a width of the flat portion in the third direction is greater than a width of an injection port of the injection unit in the third direction.

9. The working machine according to claim 1, further comprising:

a handle to be gripped by a worker, wherein the handle is located on the one side in the second direction with respect to the injection unit as viewed in the first direction.

10. The working machine according to claim 1, wherein the operation mechanism has a feeder movably supporting the fastener toward an ejection position in the injection unit, and a solenoid that drives the feeder.

11. The working machine according to claim 1, wherein the injection unit has a base portion defining an injection path through which the fastener is ejected, and a movable portion provided movable in the first direction relative to the base portion, and the end surface is provided at the movable portion.

12. A working machine comprising:

a striking unit that strikes a fastener to one side in a first direction;

a biasing unit that applies biasing force to the striking unit to strike the fastener;

a motor;

a winding-up unit that receives drive force of the motor and winds up the striking unit to the other side in the first direction against the biasing force of the biasing unit;

a tubular injection unit that ejects the fastener struck by the striking unit to the one side in the first direction from an injection path extending in the first direction;

a magazine housing a plurality of fasteners; and a supply mechanism located on one side in a second direction orthogonal to the first direction with respect to the injection unit to supply the fasteners housed in the magazine to the injection unit, wherein the injection unit has a suppression portion that suppresses a flow of dust to the one side in the second direction toward the supply mechanism, and a discharge portion that guides the dust such that the dust is discharged in a direction different from the second direction.

13. A working machine comprising:

a striking unit that strikes a fastener;

an ejection unit that ejects the fastener struck by the striking unit to one side in a first direction; and a supply unit located on one side in a second direction orthogonal to the first direction with respect to the ejection unit and configured to supply the fastener to the ejection unit, wherein the ejection unit has an end surface located at an end portion on the one side in the first direction, and the end surface has a flat portion located on the other side in the second direction, and an inclined portion inclined such that the one side in the second direction is located on the other side in the first direction, and wherein the inclined portion comprises a cutout portion recessed to the other side in the first direction.

* * * * *